(12) United States Patent  (10) Patent No.: US 6,626,292 B1
Huang  (45) Date of Patent: Sep. 30, 2003

(54) DATA DISK CONTAINER

(76) Inventor: James C. Huang, 58, Ma Yuan West St., Taichung (TW)

( * ) Notice: Subject to any disclaimer, the term of this patent is extended or adjusted under 35 U.S.C. 154(b) by 25 days.

(21) Appl. No.: 10/099,385

(22) Filed: Mar. 18, 2002

(51) Int. Cl.[7] .............................................. B65D 85/67
(52) U.S. Cl. .................... 206/308.3; 206/312; 229/67.1
(58) Field of Search ........................... 206/308.1, 308.3, 206/309, 312; 229/67.1, 67.3, 120.13, 120.18; 150/147; 402/4, 73, 75; 281/31; 383/40

(56) References Cited

U.S. PATENT DOCUMENTS

| | | | | |
|---|---|---|---|---|
| 5,275,438 A | * | 1/1994 | Struhl | 281/31 |
| 5,288,144 A | * | 2/1994 | Guderyon | 312/183 |
| 5,421,452 A | * | 6/1995 | Hybiske | 206/312 |
| 5,540,380 A | * | 7/1996 | Bryant | 229/67.1 |
| 5,579,908 A | * | 12/1996 | Johnson | 206/308.3 |
| 5,730,284 A | * | 3/1998 | Farrah | 206/308.3 |
| 5,845,772 A | * | 12/1998 | Cieplak | 206/308.3 |
| 6,032,795 A | * | 3/2000 | Ehrlund et al. | 206/312 |

* cited by examiner

Primary Examiner—David T. Fidei

(57) ABSTRACT

A data disk container has a hollow file, a retainer device, and a movable plate. The retainer device has a positioning plate and a flap plate connected to the positioning plate. The positioning plate has a bottom notch and an adhered periphery. The flap plate has an adhered bottom edge. The movable plate has a top handle bar and a bottom slide plate having a slot. The flap plate is inserted through the slot of the bottom slide plate. The retainer device is disposed in the hollow file. The adhered periphery of the positioning plate and the adhered bottom edge of the flap plate are adhered on the hollow file.

1 Claim, 5 Drawing Sheets

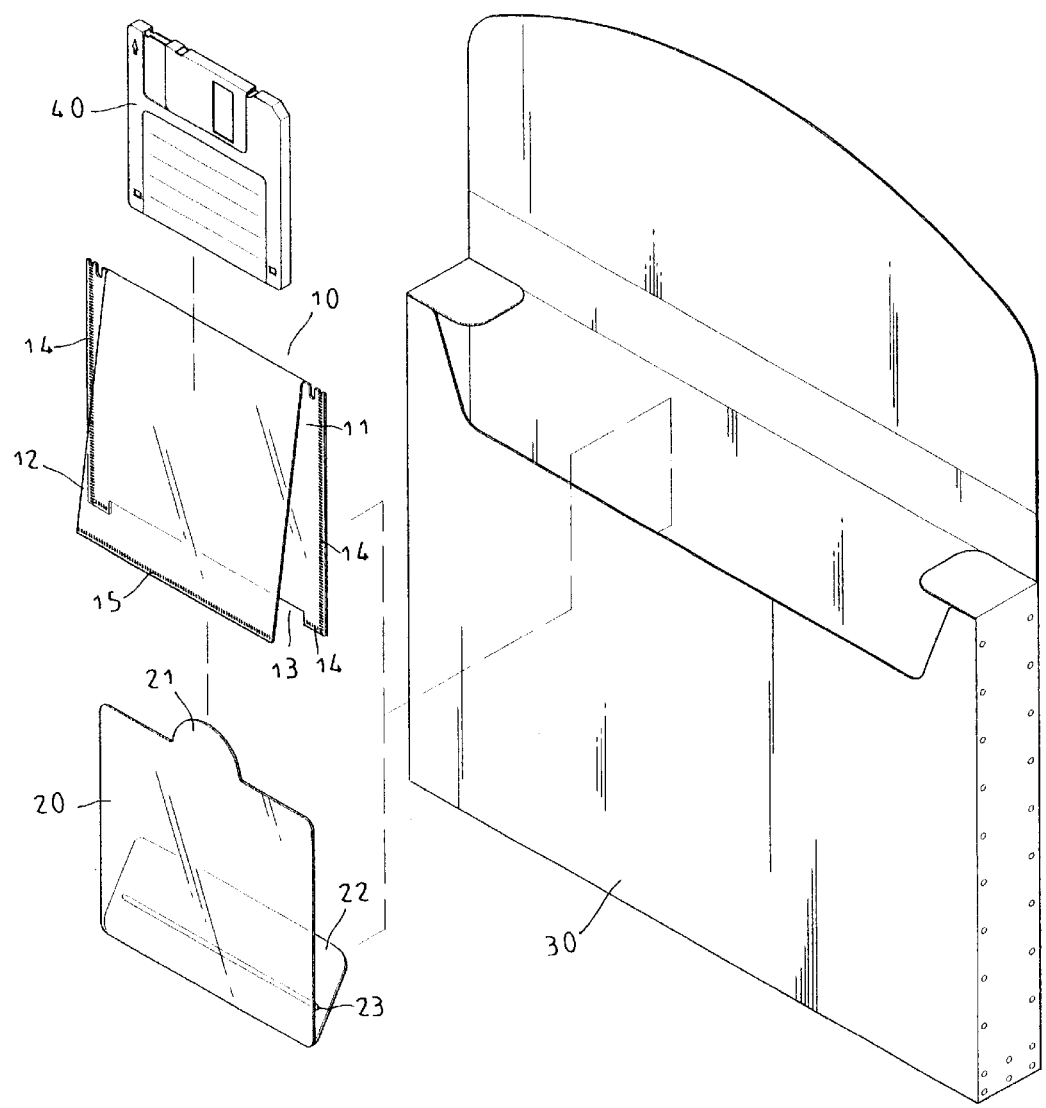
F I G. 1

DATA DISK CONTAINER

BACKGROUND OF THE INVENTION

The present invention relates to a data disk container. More particularly, the present invention relates to a data disk container which receives a floppy disk or a compact disk.

A conventional compact disk container receives a compact disk. However, a nail of a user will scratch the compact disk while a finger of the user fetches the compact disk out of the conventional compact disk. A conventional floppy disk container receives a floppy disk. However, the conventional floppy disk container is easily damaged by the finger of the user.

SUMMARY OF THE INVENTION

An object of the present invention is to provide a data disk container which receives a floppy disk or a compact disk to be fetched easily.

Accordingly, a data disk container comprises a hollow file, a retainer device, and a movable plate. The retainer device has a positioning plate and a flap plate connected to the positioning plate. The positioning plate has a bottom notch and an adhered periphery. The flap plate has an adhered bottom edge. The movable plate has a top handle bar and a bottom slide plate having a slot. The flap plate is inserted through the slot of the bottom slide plate. The retainer device is disposed in the hollow file. The adhered periphery of the positioning plate and the adhered bottom edge of the flap plate are adhered on the hollow file.

BRIEF DESCRIPTION OF THE DRAWINGS

FIG. 1 is a perspective exploded view of a data disk container of a preferred embodiment in accordance with the present invention;

DETAILED DESCRIPTION OF THE INVENTION

Figure 2:
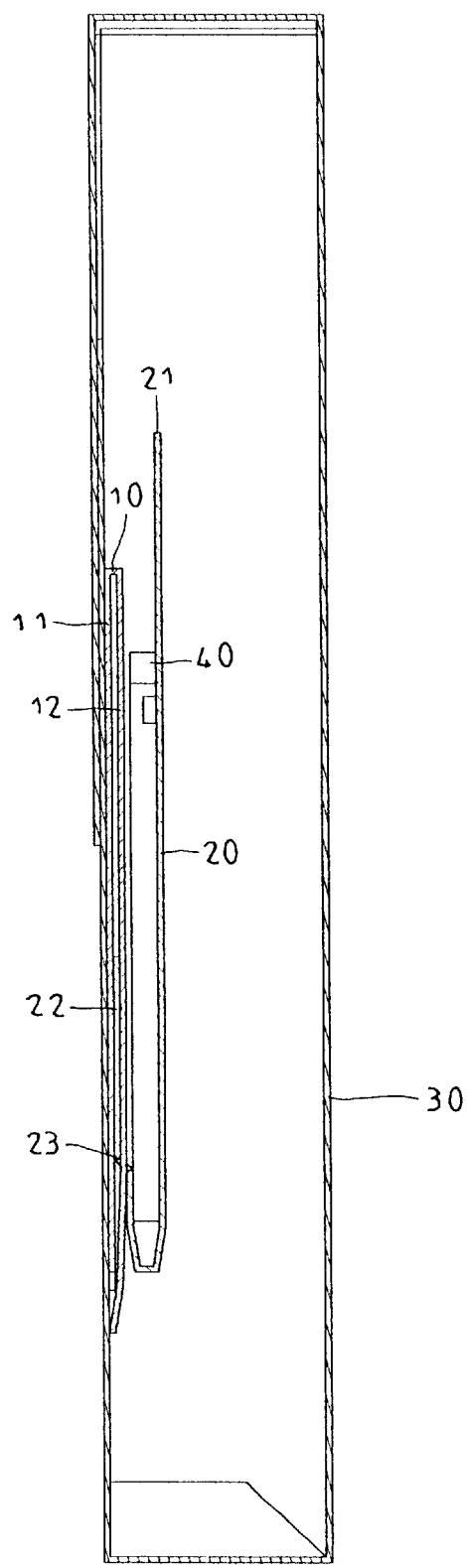
FIG. 2 is a sectional assembly view of a data disk container of a preferred embodiment in accordance with the present invention.
Figure 3:
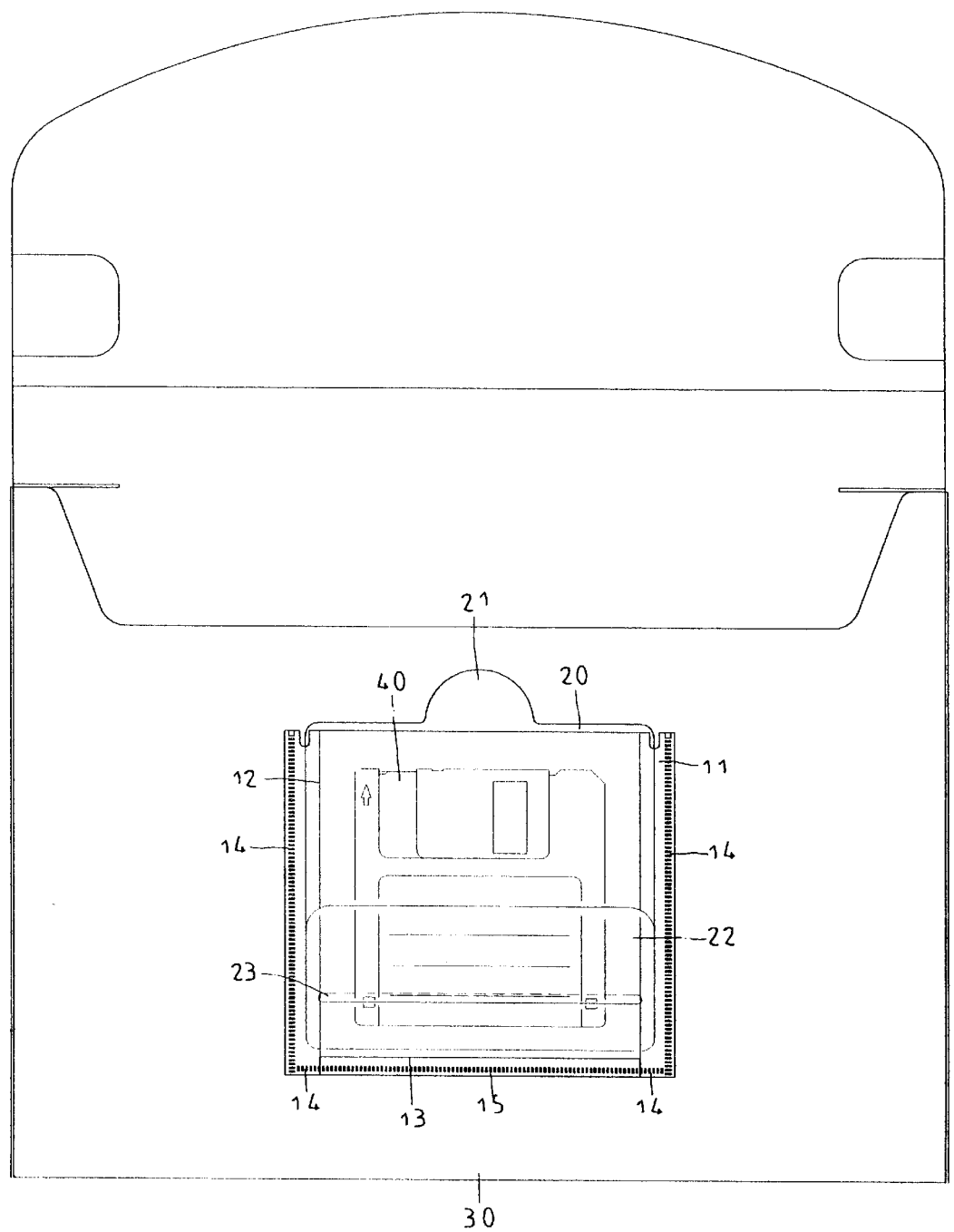
FIG. 3 is a schematic view illustrating a floppy disk is placed in a data disk container of a preferred embodiment in accordance with the present invention.
Figure 4:
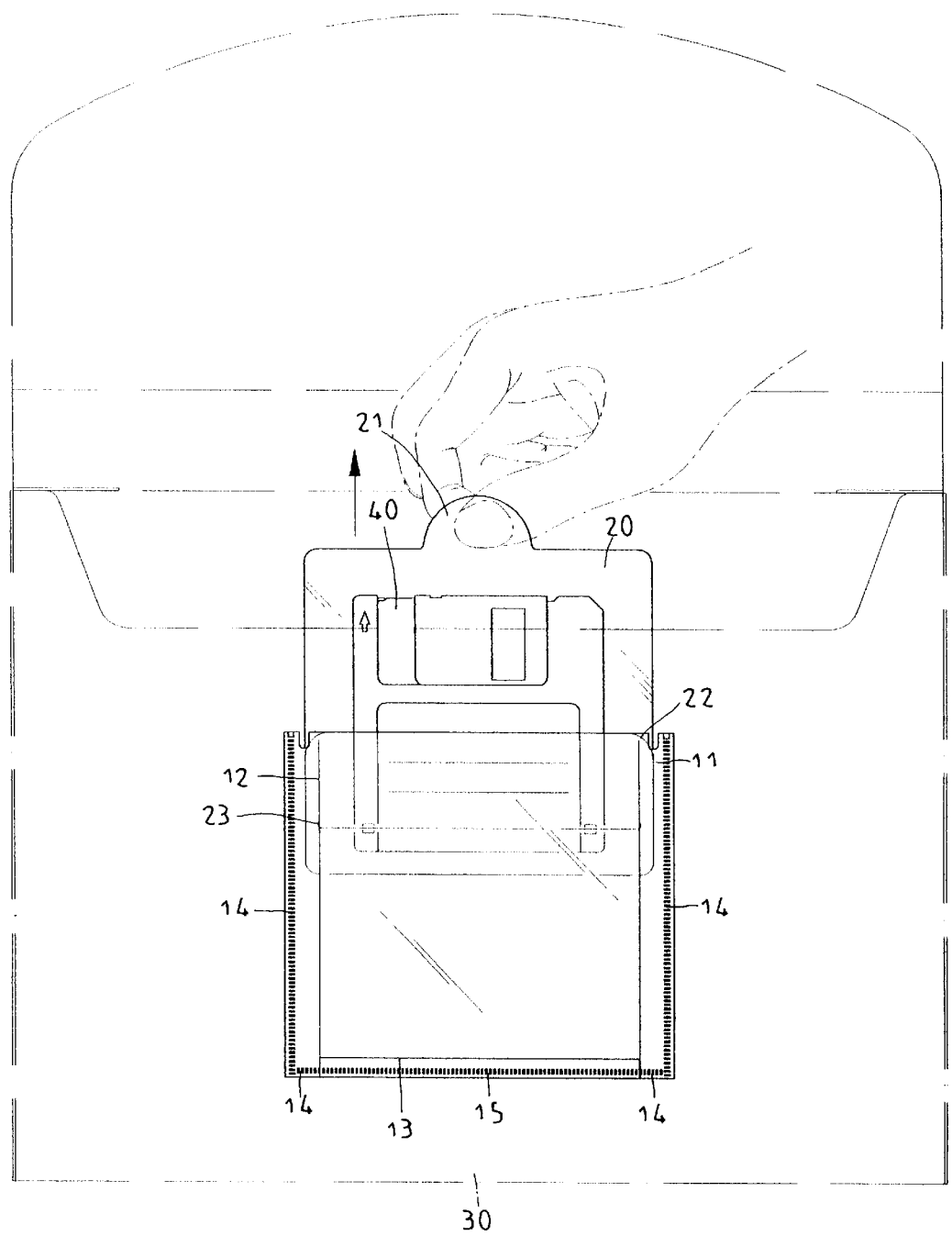
FIG. 4 is a schematic view illustrating a floppy disk is removed from a data disk container of a preferred embodiment in accordance with the present invention.

Referring to FIGS. 1 to 4, a data disk container comprises a hollow file 30, a retainer device 10, and a movable plate 20.

The retainer device 10 has a positioning plate 11 and a flap plate 12 connected to the positioning plate 11.

The positioning plate 11 has a bottom notch 13 and an adhered periphery 14.

The flap plate 12 has an adhered bottom edge 15.

The movable plate 20 has a top handle bar 21 and a bottom slide plate 22 having a slot 23.

The flap plate 12 is inserted through the slot 23 of the bottom slide plate 22.

The retainer device 10 is disposed in the hollow file 30.

The adhered periphery 14 of the positioning plate 11 and the adhered bottom edge 15 of the flap plate 12 are adhered on the hollow file 30.

Referring to FIGS. 1 to 4 again, a floppy disk 40 is disposed between the flap plate 12 and the movable plate 20.

A user will hold the top handle bar 21 to move the movable plate 20 upward so that the floppy disk 40 will be fetched easily.

Figure 5:
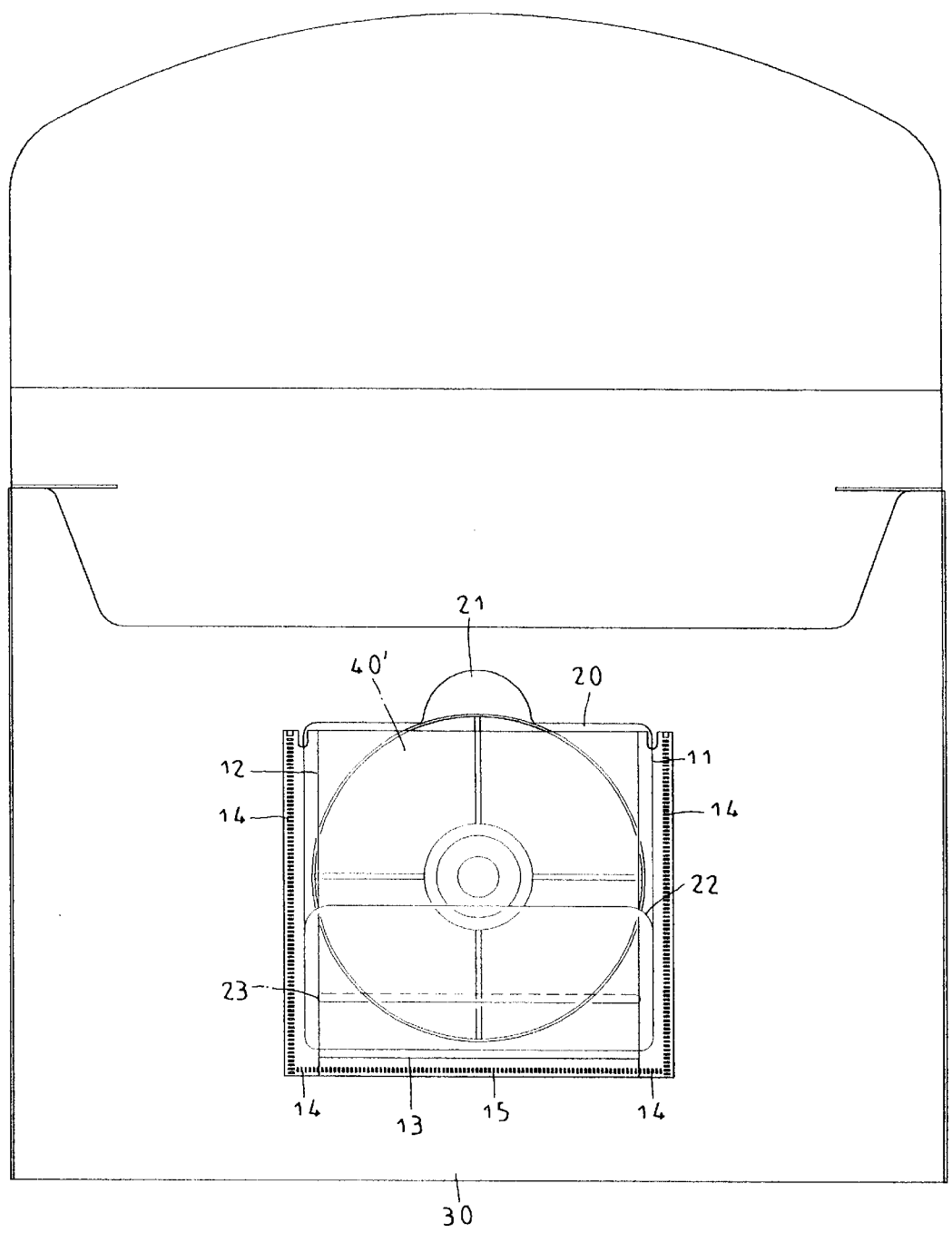
FIG. 5 is a schematic view illustrating a compact disk is placed in a data disk container of a preferred embodiment in accordance with the present invention.

Referring to FIG. 5, a compact disk 40' is disposed between the flap plate 12 and the movable plate 20.

The top handle bar 21 will be moved upward by a user so that the compact disk 40' will be fetched easily.

The present invention is not limited to the above embodiment but various modification thereof may be made. Furthermore, various changes in form and detail may be made without departing from the scope of the present invention.

I claim:

1. A data disk container comprises:
    a hollow file, a retainer device, and a movable plate,
    the retainer device having a positioning plate and a flap plate connected to the positioning plate,
    the positioning plate having a bottom notch and an adhered periphery,
    the flap plate having an adhered bottom edge,
    the movable plate having a top handle bar and a bottom slide plate having a slot,
    the flap plate inserted through the slot of the bottom slide plate,
    the retainer device disposed in the hollow file, and
    the adhered periphery of the positioning plate and the adhered bottom edge of the flap plate adhered on the hollow file.

* * * * *